March 8, 1927.    L. A. OSGOOD ET AL    1,620,125
WEIGHING SCALE
Filed April 17, 1920    2 Sheets-Sheet 1
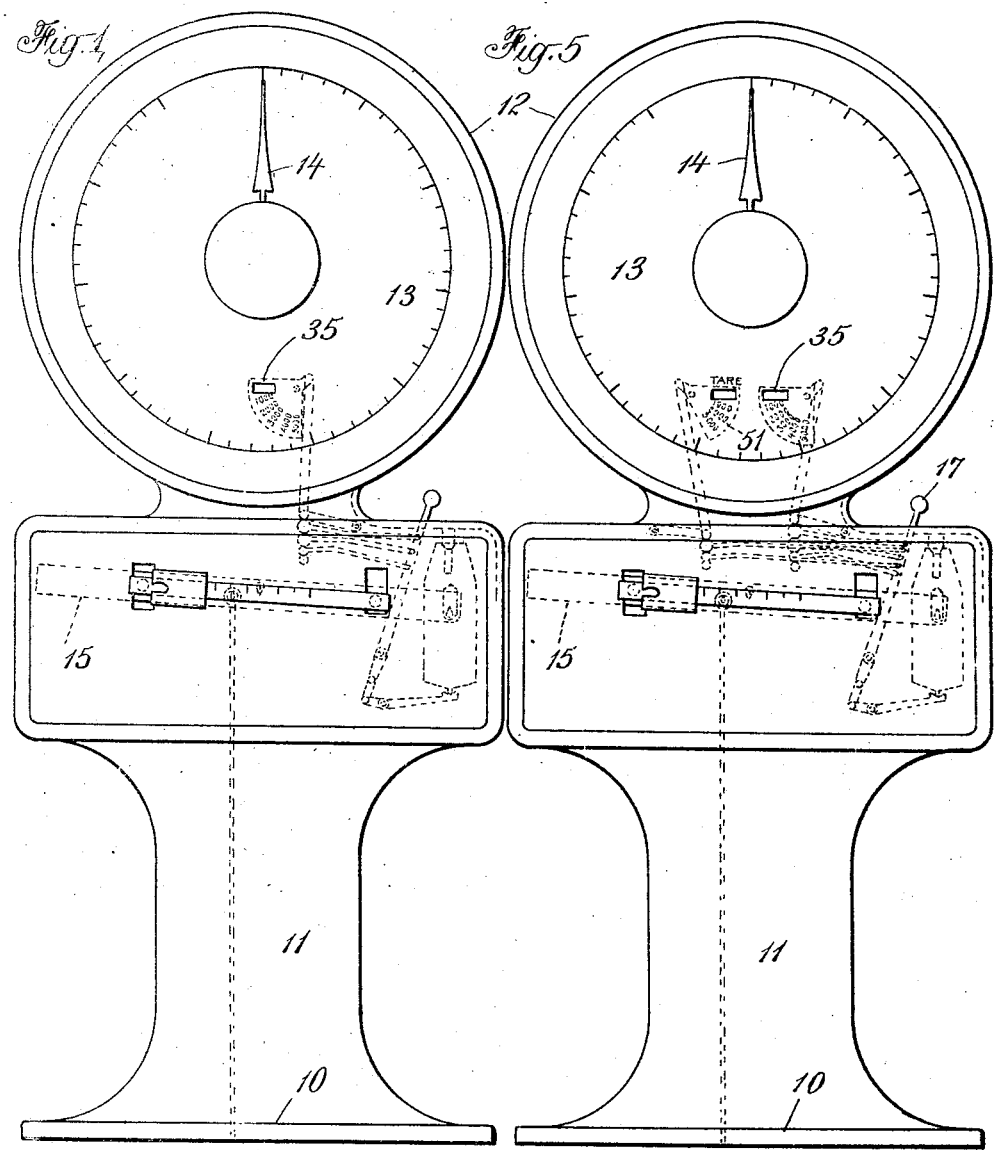

March 8, 1927.
L. A. OSGOOD ET AL
1,620,125
WEIGHING SCALE
Filed April 17, 1920    2 Sheets-Sheet 2
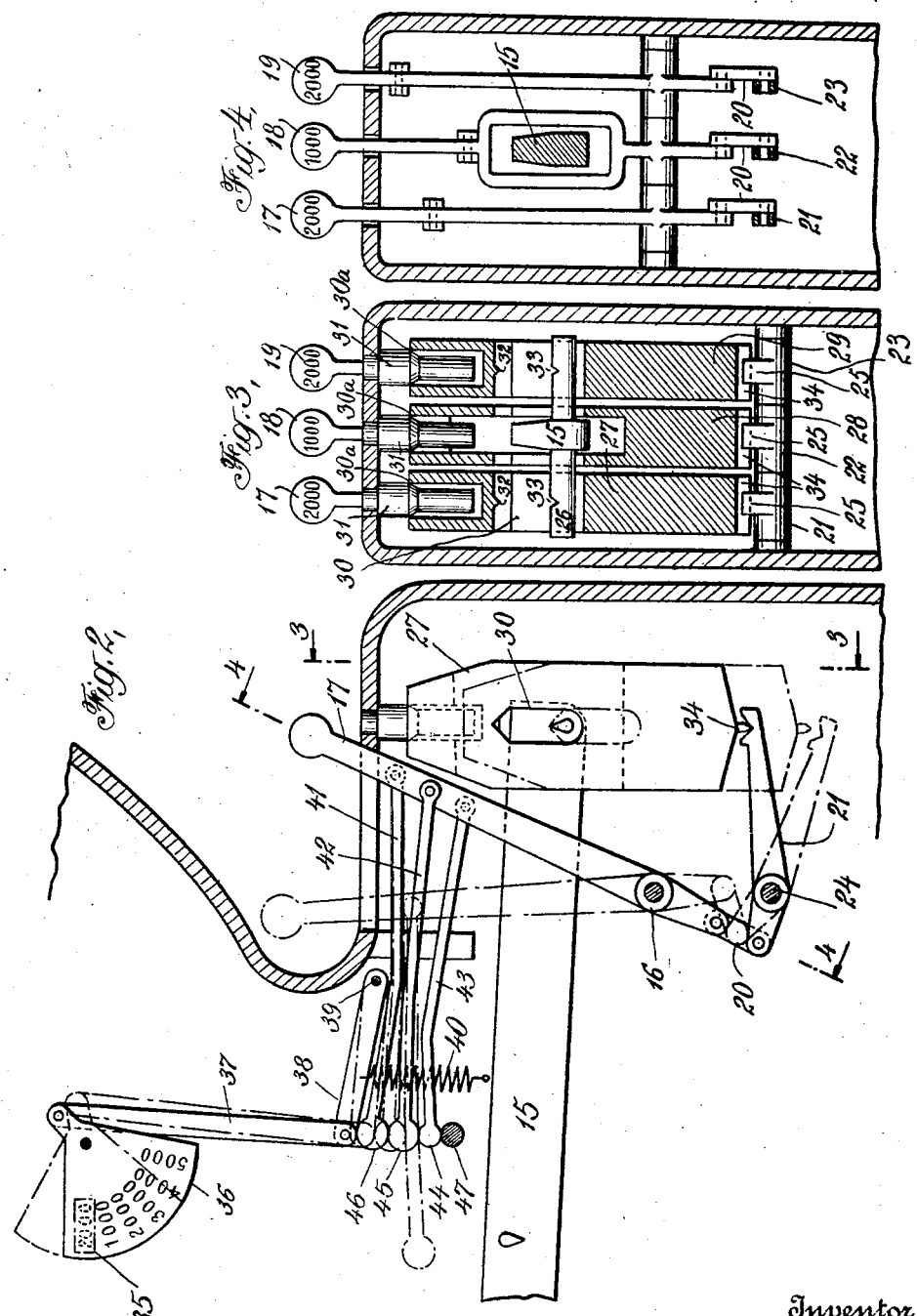
Inventors
Louis Ashley Osgood
and Elmer E. Wolf
By their Attorneys
Kerr Page Cooper & Hayward Patented Mar. 8, 1927.

1,620,125

UNITED STATES PATENT OFFICE.

LOUIS ASHLEY OSGOOD, OF DAYTON, AND ELMER E. WOLF, OF SPRINGFIELD, OHIO, ASSIGNORS, BY MESNE ASSIGNMENTS, TO INTERNATIONAL SCALE COMPANY, A CORPORATION OF ILLINOIS.

WEIGHING SCALE.

Application filed April 17, 1920. Serial No. 374,774.

This invention relates to new and useful improvements in weighing scales of the type shown and described in the patent of L. A. Osgood, No. 1,402,807, dated Jan. 3, 1922, and generally known as International No. 24 scales.

In the scale referred to provision is made for the application of a single capacity weight to the scale beam and for indicating the value of said weight when in "on" position.

In many applications it is desirable to apply more than one load offsetting or capacity weight, and this has previously been effected by successively applying one or more weights of predetermined value and in a predetermined order.

One of the objects of the present invention resides in the provision of a simple means for applying load offsetting capacity or tare weights of different weight values and in any desired order so that the maximum capacity may be reached with the fewest number of individual weights.

Other objects of the present invention reside in the provision of a simple indicating means which will at all times indicate the aggregate load offsetting value of the applied weights of a particular class.

Other objects of the present invention reside in the provision of a capacity weight applying and indicating device in which capacity weights may be used in connection with scales employing a double standard on the dial, for example, kilograms and pounds. One or more capacity weights may be used for pounds and the other for kilograms, and the indicating device can be accordingly arranged.

Other objects reside in the provision of a capacity weight indicator and a tare indicator adapted to be separately actuated in accordance with the applied weights. The double indicator arrangement may be used for the double standard scales if desired.

Other objects and advantages will be pointed out in the accompanying specification and shown in the drawings.

In the drawings:

Fig. 1 shows a front view of a No. 24 scale with the capacity weight applying and indicating device incorporated therein.

Fig. 2 shows an enlarged detail view of certain parts.

Fig. 3 is a detail sectional view taken on line 3—3 of Fig. 2.

Fig. 4 is a similar detail view taken on line 4—4 of Fig. 2.

Fig. 5 is a view similar to Fig. 1 of a modification in which certain of the applied weights are used for tare and in which means is provided for indicating the amount of the tare.

The scale which is of a well known type in the art, includes a platform 10, a pedestal housing 11, and a dial housing 12 which encases the dial 13 and weight indicating pointer or hand 14.

Fulcrumed within the pedestal is a main scale beam 15 which is connected to the weight indicator in the usual manner and to the counterbalancing means not shown.

A cross-shaft 16 is horizontally disposed across the pedestal housing and carries a number of levers 17, 18, and 19, which pass through slots in the casing as shown in Figs. 3 and 4. The upper ends of these levers are provided with knobs suitably marked with 2000, 2000 and 1000 to show the operator the weight value of each particular lever. The levers 17, 18 and 19 are adapted to be rocked about shaft 16 as an axis from the full line position to the dotted line position, as shown in Fig. 2. A short link 20 is connected to the lower end of each lever and these links are individually connected to levers or rock arms 21, 22 and 23, which are mounted to rock about a supporting shaft 24. Each of these rock arms is notched at its upper edge as shown at 25.

The main scale beam 15, adjacent its end, carries a knife edge 26 which extends outwardly at right angles from both sides of the beam. A series of capacity weights 27, 28, and 29 are slotted at 30 to permit the knife edge 26 to pass therethrough and at the upper end of the slots in weights 27 and 29, a V-bearing is formed to cooperate with knife edge 26 when the weights are lowered. The tops of the weights are drilled out as shown at 30ª to receive centering plugs 31. The weights 27 and 29 are also provided with aligning projections 32 which fit in recesses 33 in the knife edge 26 when the weights are lowered and prevent the weights from creeping along the knife edge and possibly contacting with the pedestal wall. The center weight 28 is slotted to straddle the beams 15 as clearly shown in Fig. 3. Each capacity weight at its lower end is provided with a knife edge 34 which cooperates with the notched portion 25 of the rock arms 21, 22, and 23.

To apply capacity weights to the beam, one or more of the levers 17, 18 and 19 are swung from full line position to dotted position as shown in Fig. 2. This movement lowers the ends of the corresponding rock arms and permits one or more of the capacity weights to descend from elevated position (full line) to lower position (dotted line) in which position the weight or weights are carried by the scale beam. Removal of the weights is attained by moving the parts in reverse direction, as will be readily understood. Any removal of a weight effects a change in the indication. The arrangement of levers, links and rock arms is such that the application of the weights to the beam is gentle and without excessive shock or impact. Furthermore the arrangement is such that a weight cannot get out of proper position or become dislodged entirely from the beam.

Capacity weight indicator.

The scale dial is provided with an aperture 35. Behind this aperture is a pivoted shutter 36 which is adapted to assume varying positions and display numbers through the aperture. The shutter or indicating device is adapted to be displaced so as always to display through the opening a number which corresponds to the weights upon the beam and which also corresponds to aggregate weight value of the weight or weights. This mechanism will now be described.

Pivoted to the shutter is a depending index arm 37 which at its lower end is pin-connected to a member 38 journalled upon a shaft 39. A spring 40 is connected to the member 38 and at all times tends to draw the index arm down and to swing the shutter up to display the maximum amount. To levers 17, 18 and 19 are attached rods 41, 42, and 43, these rods extending horizontally over to a point under the end of the index arm 37. The lower rod 43 is provided with a controlling abutment in the form of a disc shaped end 44. Rods 42 and 41 have similar disc shaped ends 45 and 46. The lower disc 44 is supported upon a cross bar 47 and the superimposed upper discs 45 and 46 are supported by the discs directly under them.

With all of the levers in normal position with no weights upon the scale beam, the superimposed discs will support the index arm in such position that there will be no number displayed at the opening. By swinging any one or all of the levers 17, 18, 19 to the left thereby applying corresponding capacity weights to the beam, the index arm will descend an amount equal to the difference in the diameter of the displaced discs and the thicknesses of the rod or rods carrying the same. By proportioning the disc diameters properly the index arm will assume such position as to display 1000 on the indicator when the 1000 lever is operated, 2000 when the 2000 lever is operated, 3000 when both of the aforesaid levers are operated, 4000 when both 2000 levers are operated, and 5000 with all levers operated.

The arrangement disclosed displays at all times a single unitary number at the opening which is an aggregate of all the weights of a given class upon the beam and the nature of the devices is such that the operation requires no particular sequence of lever operation. The heavy weights may be applied and indicated first or last, and the indication will always correspond. This arrangement enables the maximum capacity to be counterbalanced with the fewest weights, and thereby speeds up the operation over constructions in which a number of weights of equal value are applied one after the other.

In Fig. 5, a construction is shown in which a separate shutter 51 and independent levers and discs are employed for indicating a separate class of capacity weight such as tare or other desired weight. The mode of operation is the same and detailed description is unnecessary. It is sufficient to state that one set of weights and their corresponding levers control one indicating shutter, and the other levers and weights control the displacement of the other shutter 51.

By the term capacity weight as herein used in its broad sense, we refer to any applied weight which may be used to offset load applied to a scale. Such load offsetting by applied weights may be for the purpose of increasing the capacity of the scale or for offsetting tare or doubling the ordinary standard capacity weight for any ordinary load offsetting purposes.

We claim:

1. In a scale in combination a main scale beam, a dial housing, a dial therein and a pivotal indicator for the applied load, said dial having an aperture, a plurality of capacity weights, means for applying said weights to said beam, said means being adapted to permit one or more weights to be applied in any desired order and an indicating device within the dial housing and adapted to indicate through an aperture in the dial in a unit amount the aggregate weight value of the applied capacity weights.

2. In a scale, in combination a main scale beam, a plurality of capacity weights of varying weight values, means for applying the said weights to said beam, in any desired order, an indicating device for displaying the corresponding weight value of any single applied weight and for displaying as a unit amount the aggregate weight value of a plurality of applied weights, means operated by the capacity weight applying means for controlling the extent of movement of the indicator device, and means independent of the capacity weight applying means for moving the indicator to its controlled position.

3. In a scale, in combination, a dial housing having a weight dial and pointer therein, a main scale beam, a housing for said beam, a plurality of capacity weights within said beam housing and adapted to be applied to said beam, means for applying the weights to said beam in any desired order, and means controlled by the weight applying means for indicating at the dial and adjacent the pointer in one unitary amount the aggregate value of the weight or weights applied to the beam, said means being adapted to indicate the proper weight irrespective of the order of application of the weights to the beam.

4. In a scale, in combination, a main scale beam, a weight dial, a pivotal weight indicator, said dial having an aperture, a plurality of capacity weights adapted to be applied to said beam, a plurality of levers for applying and removing said weights thereto and therefrom, each lever being adapted to apply a particular capacity weight to the beam, said levers being adapted to be operated in any desired order to apply any desired weight or combination of weights to the beam, and an indicating device adapted to indicate through the apertured dial adjacent the pivotal weight indicator by a single amount, the aggregate weight valve of the weights applied to the beam.

5. In a scale, in combination, a main scale beam, a plurality of capacity weights adapted to be applied thereto, and means for individually applying said weights to the beam, said means comprising a plurality of independent manually operated setting levers, and a plurality of rock arms each rock arm being connected to a corresponding lever and being adapted to place a weight upon the beam when rocked in one direction and to remove a weight therefrom when rocked in the opposite direction.

6. In a scale, in combination, a main scale beam, a plurality of capacity weights adapted to be applied thereto, and a series of independent devices for applying said weights thereto, a capacity weight indicator, an index arm associated therewith, and a plurality of elements separately connected with the aforesaid devices and adapted to be displaced upon the operation of said devices, said elements being adapted to cooperate with the index arm to determine the position of the indicator.

7. In a scale, in combination, a main scale beam, a plurality of capacity weights, a plurality of levers each lever when displaced being adapted to apply or remove a particular capacity weight to or from the beam, a capacity weight indicator, a plurality of independent cooperating controlling abutments adapted to be displaced upon the displacement of corresponding levers, and means for controlling the position of the indicator in accordance with the displacement or non-displacement of said controlling abutments.

8. In a scale, in combination, a main scale beam, a plurality of capacity weights, a plurality of independent levers adapted when displaced to apply or remove capacity weights to and from the beam, a pivoted weight indicator, an index arm connected therewith, a plurality of superimposed discs disposed below said index arm, each disc adapted when displaced to permit said index arm to descend and move the indicator a predetermined amount, and a plurality of rods adapted to connect the discs with said levers.

9. In a weighing scale in combination, a scale beam, a capacity weight receiving knife edge, a plurality of capacity weights, each being slotted to permit the knife edge to travel relatively thereto, means for selectively elevating and lowering said weights, and means for centering the weights relatively to their normal vertical plane of movement and preventing lateral displacement thereof.

10. The invention set forth in claim 9 in which the centering means is provided with means for centering both the weights which are deposited upon the knife edges and the weights which are elevated and clear thereof.

11. In a weighing scale in combination with a scale element and a plurality of capacity weights arranged for application to said element in various combinations and individually, a series of pivoted levers, one for each of said capacity weights and co-acting directly therewith to support the capacity weight or weights free from the scale element upon being rocked in one position, means for selectively rocking the levers to apply or remove weights to or from the scale element, and means including an indicator controlled and variably positioned by said last mentioned means upon the rocking of the levers for indicating upon said indicator as a unitary aggregate amount the amount of load offset by the applied weights.

In testimony whereof we hereunto affix our signatures.

LOUIS A. OSGOOD.
ELMER E. WOLF.